US007697672B2

(12) United States Patent
Cesarini

(10) Patent No.: US 7,697,672 B2
(45) Date of Patent: Apr. 13, 2010

(54) CONFIGURABLE RATING SYSTEM FOR A TELECOMMUNICATIONS SERVICE PROVIDER

(75) Inventor: Andrea Cesarini, Acilia Roma (IT)

(73) Assignee: Accenture Global Services GmbH, Schaffhausen (CH)

(*) Notice: Subject to any disclaimer, the term of this patent is extended or adjusted under 35 U.S.C. 154(b) by 1082 days.

(21) Appl. No.: 11/363,838

(22) Filed: Feb. 27, 2006

(65) Prior Publication Data
US 2007/0201642 A1 Aug. 30, 2007

(30) Foreign Application Priority Data
Nov. 29, 2005 (EP) .................................. 05425849
Nov. 29, 2005 (IT) ........................... MI2005A2287

(51) Int. Cl.
*H04M 15/00* (2006.01)
(52) U.S. Cl. ............................ 379/114.03; 379/114.06; 705/34; 705/40; 705/400
(58) Field of Classification Search ................. 379/111, 379/114.01, 114.03, 114.05, 114.06, 114.07, 379/114.09, 121.02, 127.03, 125.05; 705/1, 705/14, 30, 34, 35, 37, 39, 40, 400
See application file for complete search history.

(56) References Cited
U.S. PATENT DOCUMENTS

| | | | |
|---|---|---|---|
| 5,923,741 A | 7/1999 | Wright et al. | |
| 6,182,054 B1 | 1/2001 | Dickinson et al. | |
| 6,199,047 B1 | 3/2001 | Dimino et al. | |
| 6,345,239 B1 | 2/2002 | Bowman-Amuah | |
| 6,456,986 B1 * | 9/2002 | Boardman et al. | 705/400 |
| 6,487,283 B2 * | 11/2002 | Thomas et al. | 379/112.01 |
| 6,760,417 B1 * | 7/2004 | Wallenius | 379/114.28 |
| 7,260,193 B2 * | 8/2007 | Zackrisson et al. | 379/114.28 |
| 7,305,073 B2 * | 12/2007 | Gioberti | 379/114.03 |
| 7,391,854 B2 * | 6/2008 | Salonen et al. | 379/114.2 |
| 7,526,075 B2 * | 4/2009 | Guo et al. | 379/114.03 |
| 7,562,037 B2 * | 7/2009 | Wright | 705/34 |
| 2002/0107754 A1 | 8/2002 | Stone | |
| 2003/0189498 A1 * | 10/2003 | Kakihara et al. | 340/928 |
| 2004/0088244 A1 * | 5/2004 | Bartter et al. | 705/38 |

* cited by examiner

Primary Examiner—Binh K Tieu
(74) Attorney, Agent, or Firm—Brinks Hofer Gilson and Lione

(57) ABSTRACT

A configurable rating system provides the flexibility to define rating tariffs based on any number of input parameters, such as a service identifier, origin number, destination number, event type, or other parameter. At the same time, the configurable rating system simplifies the definition, debugging, and assignment of rating parameters which ultimately determine the calculated usage event rating. The configurable rating system implements a database table driven approach which may replace any number of custom rating functions with a single rating function which determines the appropriate charge amount regardless of the telecommunications product or service.

25 Claims, 10 Drawing Sheets

Master Index Table 258

Master Input Parameters | Rating Table Set 327

| Product Name 302 | Event Type 304 | Event SubType 306 | Price List 308 | DTB 312 | WTB 314 | YTB 316 | ITB 318 | OCC 320 | DCC 322 | ICB 324 | UC 326 |
|---|---|---|---|---|---|---|---|---|---|---|---|
| DSL | 100 | 1001 | GOLD | DSL Rating Table Set 328 | | | | | | | |
| Cellular | 77 | 22 | GOLD | Cellular Rating Table Set 330 | | | | | | | |

332 →
334 →

DSL Rating Table Set 328

| Daily Time Band 312 | Weekly Time Band 314 | Yearly Time Band 316 | Identified Time Band 318 | Origin Cost Code 320 | Destination Cost Code 322 | Identified Cost Band 324 | Usage Charge 326 |
|---|---|---|---|---|---|---|---|
| DSL_DTB | DSL_WTB | DSL_YTB | DSL_ITB | DSL_OCC | DSL_DCC | DSL_ICB | DSL_UC |

Cellular Rating Table Set 330

| Daily Time Band 312 | Weekly Time Band 314 | Yearly Time Band 316 | Identified Time Band 318 | Origin Cost Code 320 | Destination Cost Code 322 | Identified Cost Band 324 | Usage Charge 326 |
|---|---|---|---|---|---|---|---|
| DSL_DTB | DSL_WTB | DSL_YTB | DSL_ITB | Cellular_OCC | Cellular_DCC | Cellular_ICB | Cellular_UC |

Figure 3

Daily Time Band 402

| Start Time 410 | End Time 412 | Daily Time Band 414 |
|---|---|---|
| 08 | 18 | Peak |
| 00 | 07 | Off-Peak |
| 18 | 24 | Off-Peak |

Weekly Time Band 404

| Product Name 416 | Event Type 418 | Event SubType 420 | Price List 422 | Day 424 | Weekly Time Band 426 |
|---|---|---|---|---|---|
| DSL | Internet | Data Transfer | GOLD | Monday | Week Day |
| DSL | Internet | Data Transfer | GOLD | Saturday | Weekend Day |

Yearly Time Band 406

| Product Name 416 | Event Type 418 | Event SubType 420 | Price List 422 | Date 428 | Yearly Time Band 430 |
|---|---|---|---|---|---|
| DSL | Any | Any | Any | December 24 | Holiday |
| DSL | Any | Any | Any | January 1 | Holiday |

Identified Time Band 408

| Product Name | Event Type 418 | Event SubType 420 | Price List 422 | Daily Time Band 432 | Weekly Time Band 434 | Yearly Time Band 436 | Identified Time Band 438 |
|---|---|---|---|---|---|---|---|
| DSL | Any | Any | GOLD | Peak | Week Day | Non-holiday | Peak – Week Day |
| DSL | Any | Any | GOLD | Off-Peak | Week Day | Non-holiday | Off-Peak – Week Day |
| DSL | Any | Any | GOLD | Peak | Weekend Day | Holiday | Peak - Holiday |

Figure 4

Origin Cost Code 502

| A Number | Origin Cost Code 508 |
|---|---|
| 001 | United States |
| 0039 | Italy |
| 0061 | Australia |

Destination Cost Code 504

| B Number | Origin Cost Code 510 |
|---|---|
| 001 | United States |
| 0039 | Italy |
| 0061 | Australia |

Identified Cost Band 506

| Origin Cost Code | Destination Cost Code | Identified Cost Band 512 |
|---|---|---|
| United States | United States | National |
| United States | Italy | International |
| Italy | Australia | International |

Figure 5

| Usage Charge | | | | | | | 602 |
|---|---|---|---|---|---|---|---|
| Product Name | Event Type | Event SubType | Price List | Identified Time Band | Identified Cost Band | Unit Price 604 | Unit Scale 606 | Billing Information 608 |
| DSL | Internet | File Transfer | GOLD | Peak - Weekday | National | $0.50/MB | 1024 | Data Services |
| DSL | Internet | File Transfer | GOLD | Off-Peak - Weekday | National | $0.30/MB | 1024 | Data Services |
| Cellular | Phone Call | Picture Transfer | GOLD | Holiday | International | $1.00 | NULL | Cellular data |

Figure 6

Identified Time Band 900

| Product Name | Event Type 416 | Event SubType 418 | Price List 420 | Daily Time Band 422 | Weekly Time Band 432 | Identified Time Band 434 902 |
|---|---|---|---|---|---|---|
| DSL | Any | Any | GOLD | Peak | Week Day | Peak – Week Day |
| DSL | Any | Any | GOLD | Off-Peak | Week Day | Off-Peak – Week Day |
| DSL | Any | Any | GOLD | Peak | Weekend Day | Peak – Weekend Day |

Cost Code 904

| Call Prefix | Cost Code 908 906 |
|---|---|
| 001 | United States |
| 0039 | Italy |
| 0061 | Australia |

Daily Time Band 910

| Start Time 912 | Daily Time Band 914 |
|---|---|
| 08 | Peak |
| 00 | Off-Peak |
| 18 | Off-Peak |

Figure 9

CONFIGURABLE RATING SYSTEM FOR A TELECOMMUNICATIONS SERVICE PROVIDER

PRIORITY CLAIM

This application claims the priority benefit of EPO Application No. 05425849.6 filed Nov. 29, 2005, and Italian Application No. MI2005A002287 filed Nov. 29, 2005, both of which are incorporated herein by reference in their entirety.

BACKGROUND OF THE INVENTION

1. Technical Field

This invention relates to telecommunications processing systems. In particular, this invention relates to a flexible and configurable database table driven processing system for determining charge amounts for a diverse array of telecommunications products and services.

2. Related Art

Rapid advances in computer system and telecommunications technology have lead to a vast array of communication services available to the consumer. Such telecommunication services include Internet service, cable television service, cellular phone service, paging service, combined voice and data delivery service, and many other services. Furthermore, most services may be wireless or wireline based.

For each of the many telecommunications products and services, a service provider must determine how to rate the service. Rating is the process through which the service provider determines how much to charge for a telecommunication usage event. For example, when a cellular phone call finishes, a service provider determines how much to charge for the phone call based on many different factors, such as whether the call was a long distance call.

There are many different telecommunications products and services. There are also many different factors which a service provider may want to have influence how much should be charged for each use of a telecommunications service. As a result, there is an immense number of potential combinations of telecommunications services and associated rating functions. Indeed, in the past, service providers had to define, configure, and troubleshoot an extensive array of custom rating functions, assign the rating functions to specific telecommunications products and services, and devote significant time and monetary resources to maintaining and updating the rating functions.

Adding a new rating function often took many days, and sometimes even weeks. At the same time, the telecommunications industry is one which continually improves and evolves its existing products and services, and which frequently introduces new products and services. Accordingly, such delays often limit the introduction, evolution, and improvement of telecommunications products and services.

A need has long existed for an improved rating system for a telecommunications service provider.

SUMMARY

Implementing an improved rating system poses significant technical challenges. For example, the rating system should provide the flexibility to define a usage event rating based on any number of input parameters. At the same time, the technical challenge must be met of simplifying the establishment, application, and debugging of rating parameters which ultimately determine the charge amount calculated for any particular telecommunication product or service. Despite these two technical challenges being at odds with one another, the technical challenges are met with the technical solutions described below.

One aspect of the invention is a configurable rating system for a telecommunications service provider. In one implementation, the configurable rating system provides a table driven rating configuration approach in a traditionally custom rule and code driven billing system, such as the Intec Singl.eView™ billing system. The table driven configuration approach leverages significant experience in the telecommunications industry and greatly improves the speed with which rating configuration may be accomplished.

The configurable rating system includes a rating database which establishes a master index table and multiple rating tables. The master index table defines a mapping record which associates a master input parameter set with a rating table set. The master input parameter set represents information or characteristics of the telecommunications usage event to be rated. The multiple rating tables define the tables in the rating table set.

A memory in the configurable rating system stores data record parameters which report a usage event. The data record parameters may be obtained from a Call Data Record (CDR), an Internet Protocol Data Record (IPDR) or from another source of information about a usage event. The data record parameters include, as two examples, an origin identifier (e.g., an 'A number') and an event magnitude (e.g., a phone call duration in seconds). The memory also includes a rating determination program. The rating determination program determines a charge amount for the usage event based on the master index table, the rating tables, and the data record parameters. The same rating determination program may be assigned to any number of telecommunication products or services; the table driven solution greatly simplifies establishing and determining ratings for usage events.

Summarizing the operation of the rating determination program, the program may first obtain a product identifier based on at least one of the data record parameters. For example, the program may obtain the product identifier as a function call parameter to the program. Alternatively, the program may itself determine the product identifier. In one implementation the product identifier is determined based on the origin number and pre-established product configuration records which associate the origin number to a particular product.

In addition, the rating determination program indexes the product identifier and selected data record parameters into the master index table to identify the rating table set. The rating determination program thereby identifies the set of rating tables applicable for the telecommunications product or service. The rating determination program then executes a sequence of searches through the rating table set to determine rating attributes based on the product identifier, data record parameters, and other rating attributes. After completing the sequence of searches, the rating determination program obtains a unit price for the usage event. Optionally, the rating determination program may also obtain a unit scale for the usage event as described in more detail below.

From the unit price (and optionally the unit scale), the rating determination program determines the charge amount for the usage event. For example, the charge amount may be determined according to:

Charge Amount=(Unit Price*Event Magnitude)/(Unit Scale)

The master index table may define multiple mapping records which establish multiple rating table sets applicable for any combination of master input parameters. Examples of rating tables include an origin cost code rating table, a destination cost code rating table, a cost band rating table, a daily time band rating table, a weekly time band rating table, a yearly time band rating table, and a usage charge rating table. Each rating table will be explained in detail below.

Examples of data record parameters include an event magnitude, an event type, an event sub-type, an event start time and an event end time, event day, event date a destination identifier, and an origin identifier. Examples of rating attributes include an origin cost code rating attribute, a destination cost code rating attribute, a cost band rating attribute, a time band rating attribute, a daily time band rating attribute, a weekly time band rating attribute, and a yearly time band rating attribute. Each parameter and rating attribute will be explained in more detail below.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 3 shows a master index table which established in the configurable rating system to determine rating table sets for rating a telecommunication usage event.

FIG. 4 shows daily, weekly, and yearly rating tables for determining an identified time band applicable to a telecommunication usage event.

FIG. 5 shows origin cost code and destination cost code rating tables for determining an identified cost band applicable to a telecommunication usage event.

FIG. 6 shows a usage charge rating table for identifying a unit price and unit scale applicable to a telecommunication usage event.

FIG. 9 shows an alternate implementation of an identified time band rating table, a cost code rating table, and a daily time band rating table.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the configurable rating system and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the configurable rating system will be described, methods, systems, and articles of manufacture consistent with the configurable rating system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Figure 1:
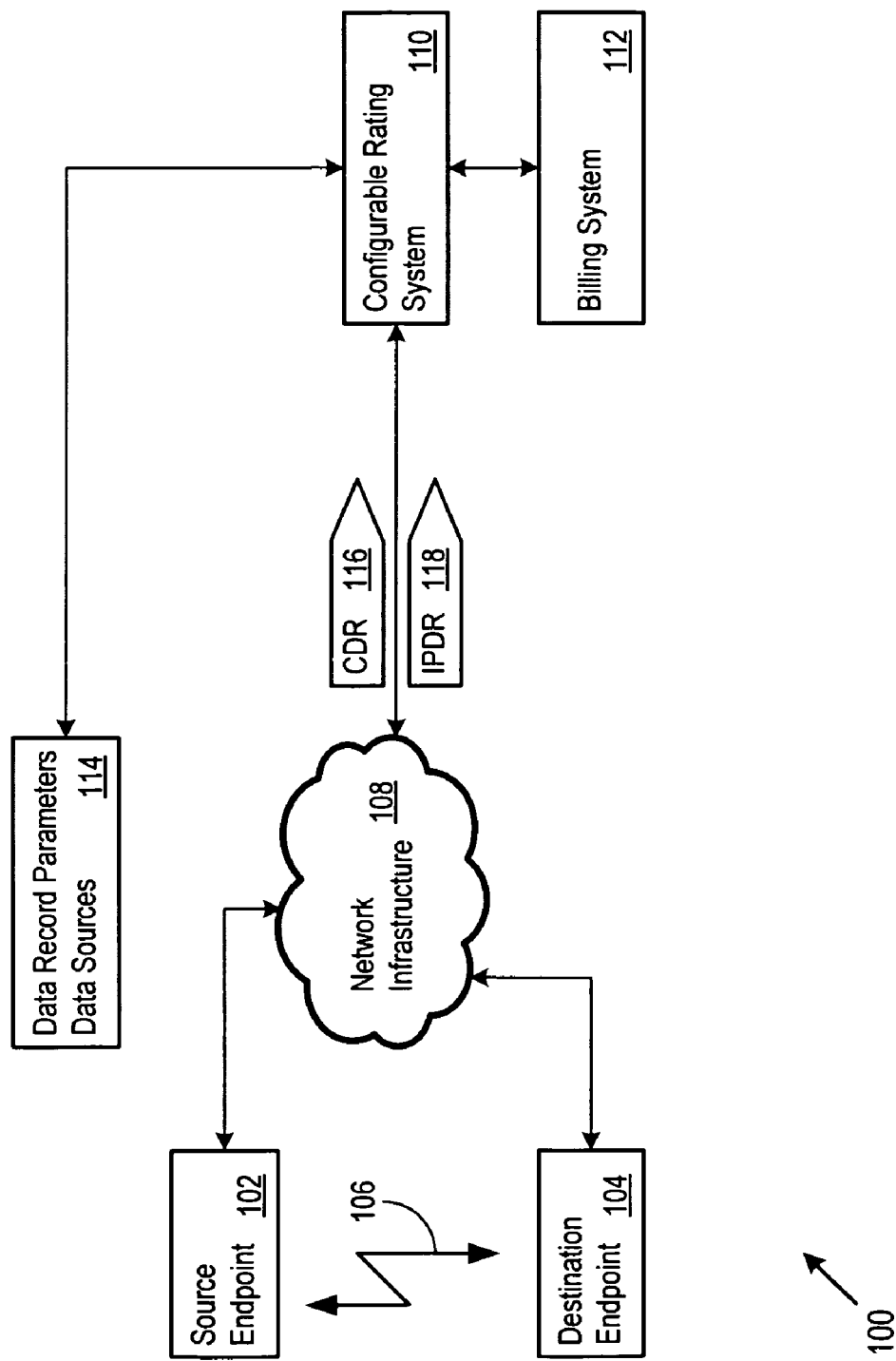
FIG. 1 shows a telecommunications network which sends data record parameters to a configurable rating system which determines charge amounts for telecommunication usage events.

FIG. 1 shows a portion of a telecommunications network 100. A source endpoint 102 communicates with a destination endpoint 104 through a telecommunications connection 106. The source endpoint 102 may be a landline or cellular phone, software application such as an Instant Messenger program, a personal computer executing a Web browser, or any other hardware or software entity. Similarly, the destination endpoint 104 may be another cellular or landline phone, software application, personal computer, file server, or any other hardware or software entity.

The network infrastructure 108 supports the entities which interact in the telecommunications network. For example, the network infrastructure 108 may help to establish, monitor, and terminate phone calls, network connections, or other types of communication sessions. In addition, the network infrastructure 108 may gather, monitor, and report information concerning each telecommunication usage event which occurs in a telecommunication network. Examples of telecommunication usage events include cellular phone calls, instant messaging sessions, short message transfers, Internet browsing or data transfer sessions, sending or delivery of paging messages, email messages, facsimile transmissions, or any other type of telecommunication in event supported by the telecommunication network.

The network infrastructure 108 communicates data record parameters gathered for each usage event to the configurable rating system 110. In response, the configurable rating system 110 determines how much should be charged for each usage event. The configurable rating system 110 may then communicate the charge amount to external systems, such as the billing system 112.

The configurable rating system 110 may receive data record parameters from other sources 114, however. Such sources may include, as examples, FTP file transfers, third party data record preparers, or any other source of data record parameters for a telecommunication usage events. The network infrastructure 108 or the other data sources 114 may communicate the data record parameters to the configurable rating system 110 in the form of a Call Data Record (CDR) 116, Internet Protocol Data Record (IPDR) 118, or in other forms.

Table 1, below, shows an example of the data record parameters which the configurable rating system 110 may receive from the network infrastructure 108 or the other data sources 114.

TABLE 1

| Data Record Parameter | Description |
| --- | --- |
| Event Type | An identifier of the telecommunication usage event (identifying, for example, that the usage event is a DSL events, or a cellular phone call event) |
| Event SubType | An identifier of an event subtype for the telecommunication usage event (identifying for example that the DSL event is an Internet browsing event or that the cellular phone call event is a GSM event). |
| Event Start Date | The start date of the telecommunication usage event. |
| Event Start Time | The start time of the telecommunication usage event. |
| A Number | An identifier of an origin of the telecommunication usage event. |
| B Number | An identifier of the destination of the telecommunication usage event. |
| Event Magnitude | An identifier of the duration of the telecommunication usage event |

Figure 2:
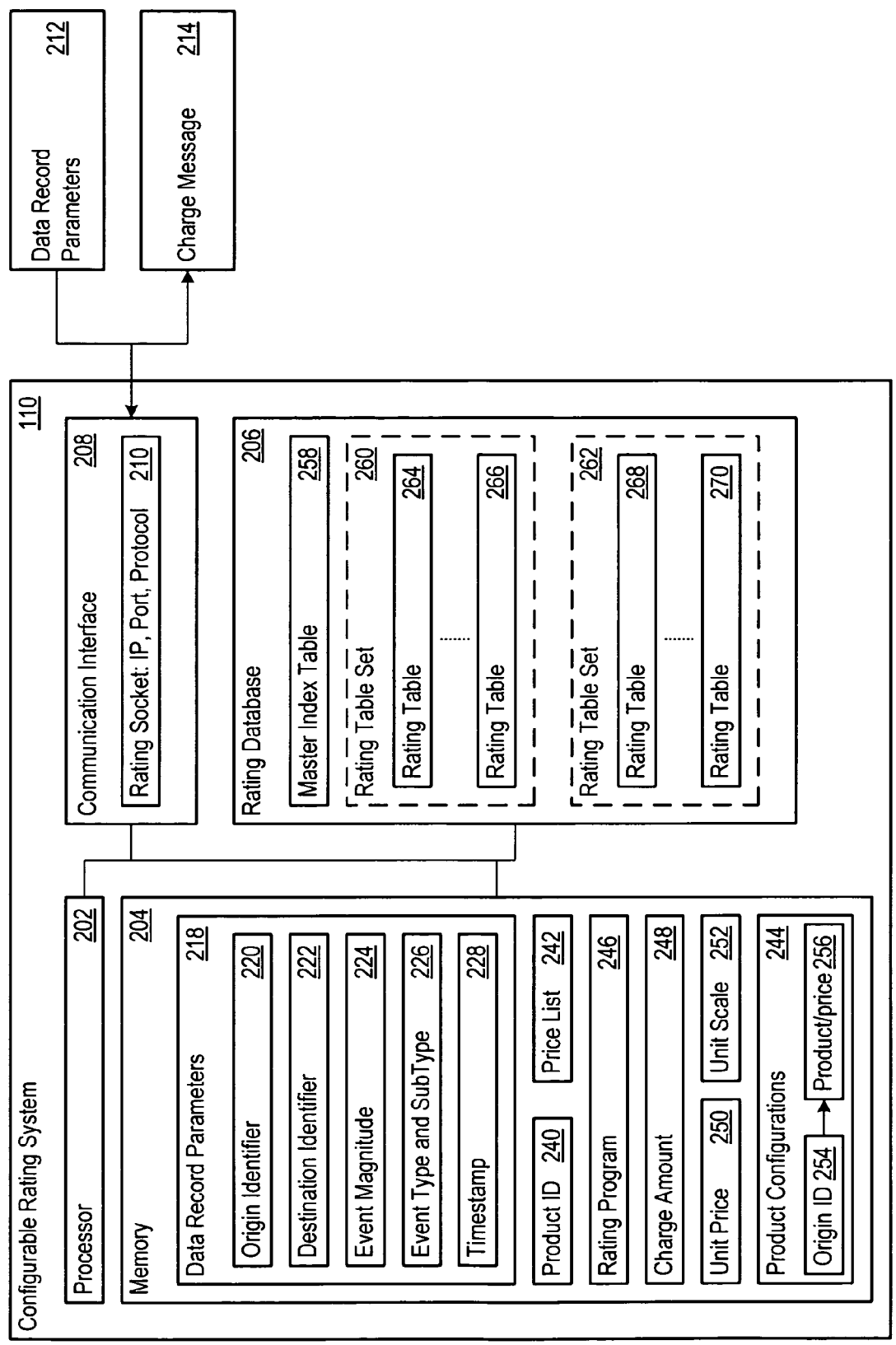
FIG. 2 shows a configurable rating system which determines a charge amount for a telecommunications usage event based on data record parameters.

FIG. 2 shows the configurable rating system 110. The configurable rating system 110 includes a processor 202, memory 204, and a rating database 206. A communication interface 208 connects the configurable rating system 110 to external systems. The communication interface 208 may implement a socket interface 210 (e.g., including an Internet protocol address, port number, and protocol), or any other type of communication interface. The configurable rating system 110 receives data record parameters 212 and may communicate charge messages 214 specifying a charge amount for a usage event to external systems.

The memory 204 stores the data record parameters 218 obtained from, for example, a CDR. As shown in FIG. 2, the data record parameters to 218 include an origin identifier 220 (e.g., a CDR 'A Number'), a destination identifier 222 (e.g., a CDR 'B Number'), and an event magnitude 224. The data record parameters 218 also include an event type parameter and an event subtype parameter 226 and an event timestamp 228. The configurable rating system 110 may process the event timestamp 228 to obtain an event start time and start date, including the day of the week, and day of the year.

As shown in FIG. 2, the memory 204 also stores a product identifier 240 and a price list identifier 242. The product identifier 240 and the price list identifier 242 may be determined from the product configuration records 244 as explained in more detail below. A rating program 246 in the memory 204 determines a charge amount 248 for a telecommunication usage event. The charge amount 248 may be determined based on a unit charge 250, a unit scale 252, and the event magnitude 224.

The product configuration records 244 may guide the configurable rating system 110 in determining the product identifier 240 and price list 242 applicable to a telecommunication usage event. For example, the product configuration records 244 may map origin identifiers 254 to product identifiers and price list identifiers. The product identifier 240 may be an alphanumeric identifier of the product associated with the origin number received in the data record parameters 212. For example, the product identifier 240 may match an origin cell phone number to a product identifier of 'Cellular'. As another example, the product identifier 240 may match an Internet protocol or hardware address given in the origin identifier to a product identifier of 'DSL'.

Similarly, the product configuration records 244 may associate the origin identifier with a price list identifier 242. For example, the subscriber associated with the origin number and product identifier may be associated with a price list of 'Gold' which indicates the pricing plan applicable for the subscriber. The associations in the product configuration records 244 may be based on any alternative or additional call data parameters received by the configurable rating system 110.

As noted above, the configurable rating system 110 also includes a rating database 206. The rating database 206 establishes a master index table 258. In addition, the rating database 206 establishes multiple rating tables. The master index table 258 logically groups the rating tables into rating table sets for rating a telecommunication usage event.

The example shown in FIG. 2 shows a first rating table set 260 (e.g., for rating a data transfer usage event) and a second rating table set 262 (e.g., for rating a cellular phone call usage event). More or fewer rating table sets may be defined in the rating database 206. Any rating table set may be used to rate any one or more types of usage events (e.g., a single rating table set may rate both DSL and cellular phone call usage events).

Each rating table set may include one or more rating tables. In addition, any given rating table may be included in any number of rating table sets. In FIG. 2, the first rating table set includes multiple rating tables, including the rating tables 264 and 266. The second rating table set 262 includes multiple rating tables, including the rating tables 268 and 270.

The rating determination program 246 determines the charge amount 248 for any given telecommunication usage event. To do so, the rating determination program 246 may first determine the product identifier 240 and price list 242 associated with the usage event. For example, the rating program may search the product configuration records 244 for a product identifier and price list matching the origin identifier 220.

The rating determination program 246 then determines the appropriate rating table set which the rating program 246 will use to determine the charge amount 248. To that end, the rating determination program 246 may index a master parameter set which includes, for example, the product identifier 240, the price list 242, and/or any of the data record parameters 218 into the master index table 258. The master index table 258 maps the input parameter set to the rating table set appropriate for the usage event characterized by the master parameter set.

Having determined the appropriate rating table set, the rating program 246 proceeds to execute a sequence of searches through the tables in the rating table set. The searches employ the data record parameters 218, parameters derived from the data record parameters 218 (e.g., the product identifier 240), as well as rating attributes obtained from the rating tables. An example of a sequence of searches is given below. In general, the rating program 246 obtains, through the sequence of searches, a unit price 250 and optionally a unit scale 252 associated with a telecommunication usage event. The rating program 246 may then determine the charge amount 248 according to:

Charge Amount=(Unit Price*Event Magnitude)/(Unit Scale)

The unit price 250 gives the cost per unit of the telecommunication service which is to be rated. The unit price 250 may be expressed, as examples, in terms of dollars per minute, cents per second, euro per kilobyte, dollar per megabyte, or as any other unit price. The unit scale 252 provides a scaling factor for matching the dimensions of the event magnitude 224 to the dimensions of the unit price 250. For example, when the event magnitude is expressed in seconds, and the unit price 250 is expressed in dollars per minute, the unit scale 252 is 60.

The configurable rating system 110 may communicate the determined charge amount 248 to external systems. For example, the configurable rating system 110 may communicate the charge message 214 including the charge amount 248 to billing system 112.

FIG. 3 shows an example of the master index table 258. The master index table 258 includes a product name field 302, an event type field 304, an event subtype field 306, and a price list field 308. Thus, a product name, an event, an event subtype, and a price list form a set of master input parameters 310 which the rating program 246 may index into the master index table 258. In other implementations, there may be more, fewer, or different master input parameters.

The master index table 258 identifies, for any given master input parameters 310, the appropriate rating table set 327 for rating the usage event characterized by the master input parameters. The master index table 258 includes fields which provide the names of individual tables which constitute the rating table sets. In the example shown in FIG. 3, the master index table 258 includes a daily time band master index rating table field 312, a weekly time band master index rating table field 314, and a yearly time band master index rating table field 316. In addition, the master index table 258 includes an identified time band master index rating table field 318, an origin cost code master index rating table field 320, a destination cost code master index rating table field 322, an identified cost band master index rating table field 324, and a usage charge attributes master index rating table field 326. More, fewer, or different master index rating table fields may be established in the master index table 258.

FIG. 3 shows a DSL rating table set 328, and a cellular rating table set 330. Table 2, below, shows an example of table names established in the master index table 258 for the DSL rating table set 328. Similarly, table 3, below, shows the table names established in the master index table 258 for the cellular rating table set 330. Furthermore, as noted above, any rating table set may share rating tables. In the example shown in FIG. 3, the cellular rating table set 330 uses the same attribute tables for the daily, weekly, and yearly time band attributes as the DSL rating table set 328

TABLE 2

DSL Rating Table Set

| Master Index Rating Table Field | Table Name |
| --- | --- |
| Daily Time Band | DSL_DTB |
| Weekly Time Band | DSL_WTB |
| Yearly Time Band | DSL_YTD |
| Identified Time Band | DSL_ITB |
| Origin Cost Code | DSL_OCC |
| Destination Cost Code | DSL_DCC |
| Identified Cost Band | DSL_ICB |
| Usage Charge | DSL_UC |

TABLE 3

Cellular Rating Table Set

| Master Index Rating Table Field | Table Name |
| --- | --- |
| Daily Time Band | DSL_DTB |
| Weekly Time Band | DSL_WTB |
| Yearly Time Band | DSL_YTD |
| Identified Time Band | DSL_ITB |

TABLE 3-continued

Cellular Rating Table Set

| Master Index Rating Table Field | Table Name |
| --- | --- |
| Origin Cost Code | Cellular_OCC |
| Destination Cost Code | Cellular_DCC |
| Identified Cost Band | Cellular_ICB |
| Usage Charge | Cellular_UC |

In general, the master index table 258 stores mapping records which associate input parameters with rating table sets. FIG. 3 shows a DSL mapping record 332 and a cellular mapping record 334. The DSL mapping record 332 establishes that for a product name of DSL, an event type of 100, an event subtype of 1001, and a price list of GOLD, the DSL rating table set 328 is used to rate the usage event. Similarly, the cellular mapping record 334 establishes that for a product name of Cellular, an event type of 77, an event subtype of 22, and a GOLD price list, the cellular rating table set 330 is used to rate the usage event. More, fewer, or different mapping records may be defined in the master index table 258.

Each rating table is indexed by one or more parameters which influence the identification of an appropriate rating attribute for the usage event. The parameters may be one or more of the data record parameters 218, parameters derived from the data record parameter 218 (e.g., the product identifier 240 or price identifier 242), or any other input parameter.

One parameter of interest in determining the charge amount 248 is the time at which a telecommunication usage event occurred. The charge amount 248 may vary widely depending on the day, date, and time of the usage event. Accordingly, the rating database 206 establishes rating tables which the rating program 246 uses to determine an applicable time band rating parameter for rating the usage event.

Figure 7:
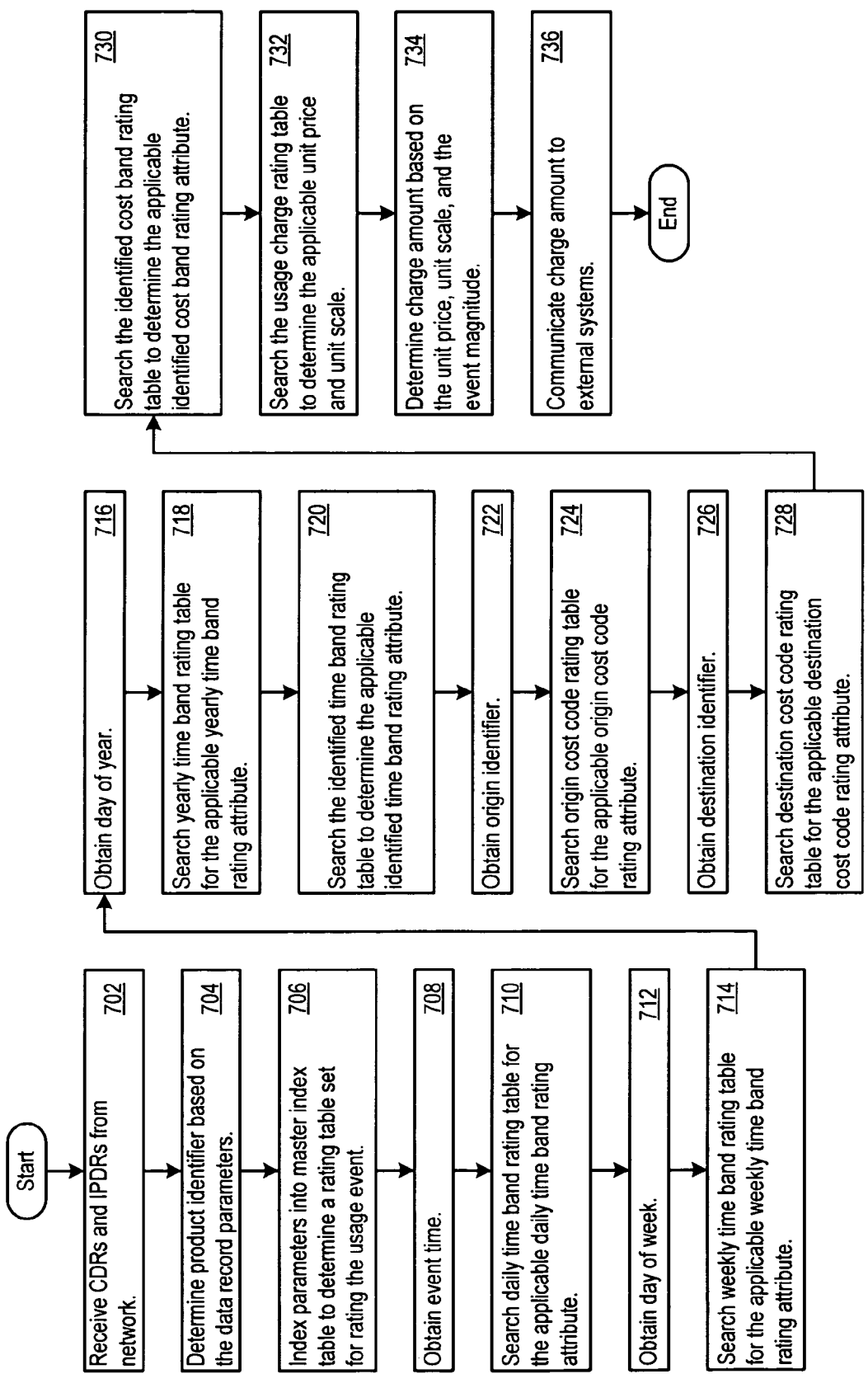
FIG. 7 shows the acts that the configurable rating system may take to rate a telecommunication usage event.
Figure 10:
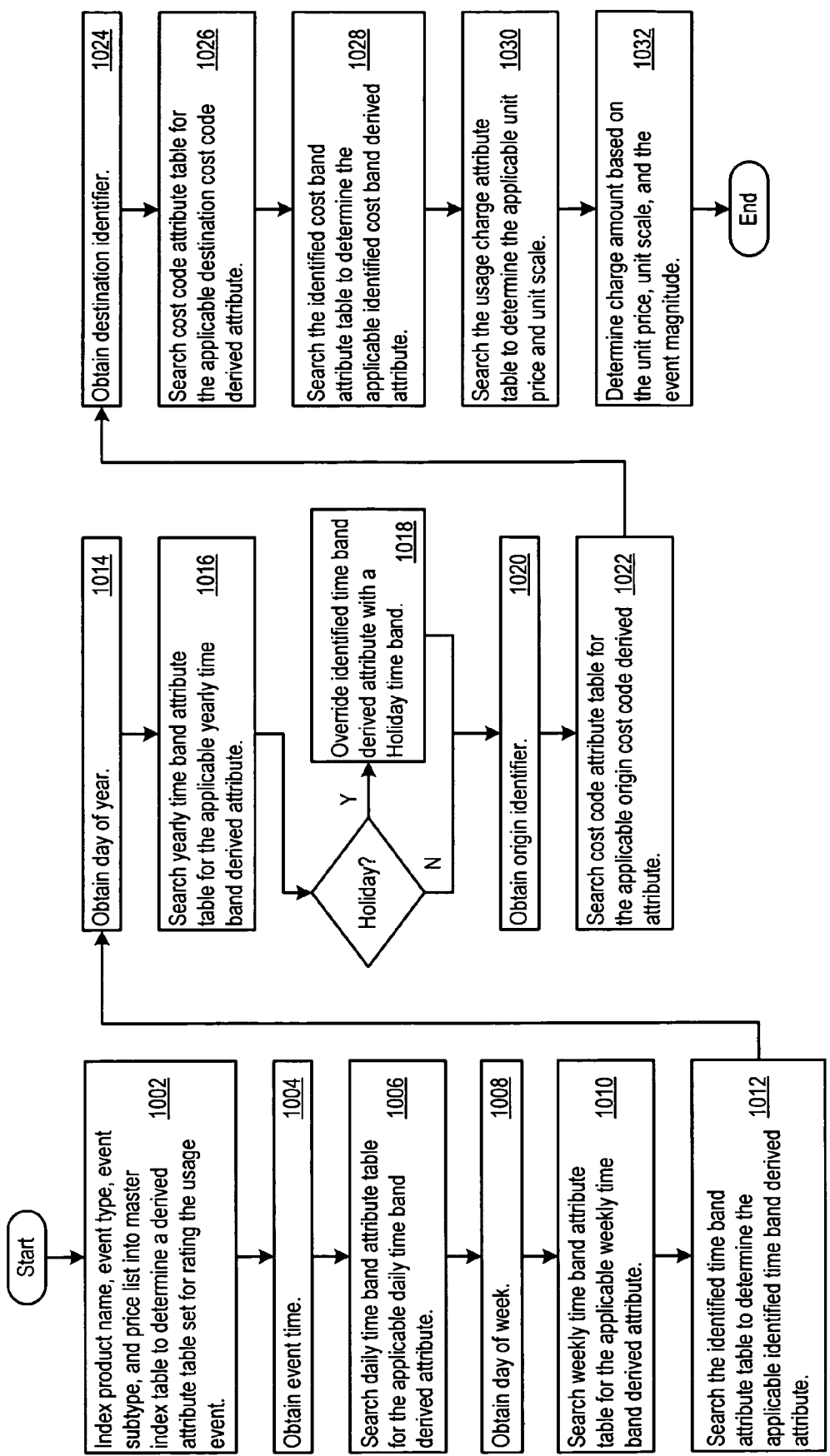
FIG. 10 shows the acts that the configurable rating system may take to rate a telecommunication usage event using the rating tables shown in FIG. 9.

The following discussion, including FIGS. 4 and 7, provides a description of the overall rating process. Farther below, the discussion of FIGS. 9 and 10 provides a discussion of a specific example of an implementation in the Singl.eView™ environment. In particular, FIG. 4 shows a daily time band rating table 402, a weekly time band rating table 404, and a yearly time band rating table 406. Knowing the daily, weekly and yearly time band rating attributes, the rating determination program 246 may then search the identified time band rating table 408 to determine the identified time band rating attribute which the service provider has associated with the particular time, day, and date when the usage event occurred.

The daily time band table 402 is indexed by a start time field 410 and an end time field 412, thereby determining the daily time band rating attribute 414. In the example shown in FIG. 4, a usage event that occurs between 8 a.m. and 6 p.m. results in a 'Peak' daily time band rating attribute for the usage event. A usage event that occurs between midnight and 7 a.m., or that occurs between 6 p.m. and midnight results in an 'Off-Peak' daily time band rating attribute for the usage event. In other implementations, the daily time band table 402 may omit the end time field 412 or start time field 410, or may include additional different index fields. For example, in the Singl.eView™ billing environment, the daily time band table 402 may be indexed by the start time field 410 alone. Thus, rating program 246 may use one index expression to search the daily time band table 402 (e.g., by single range). If the value of the index expression lies within one of the ranges specified in the table 402, one or more result values may be returned to the rating program 246.

The weekly time band rating table 404 is indexed by a product name field 416, an event type field 418, and an event subtype field 420, a price list field 422, and a day field 424. Thus, the weekly time band rating attribute 426 may vary based on any of those parameters, such as the day on which the usage event happened. FIG. 4 shows examples of a DSL product for which different weekly time band rating attributes are defined. For a DSL product used on Monday, for example, the weekly time band rating attribute is 'Week Day'. However, for the same DSL product used on Saturday, the weekly time band rating attribute is 'Weekend Day'.

Similarly, the yearly time band rating table 406 establishes a yearly time band rating attribute for the usage event, indexed in part on a date field 428. The yearly time band rating attribute 430 may determine, for example, whether the usage event occurred on a holiday and, therefore, whether special pricing considerations are applicable. As shown in examples in FIG. 4, the yearly time band rating table 406 associates a usage event occurring on December 24 or January 1 with the 'Holiday' yearly time band cost.

A rating attribute obtained from one rating table may be an index parameter for one or more other rating tables. For example, the identified time band rating table 408 includes a daily time band rating index field 432, a weekly time band rating index field 434, and a yearly time band rating index field 436. Accordingly, the determination program 246 may search the identified time band rating table 408 not only on the basis of the data record parameters 218 but also on the basis of the previously determined daily time band rating attribute 414, the weekly time band rating attribute 426, and the yearly time band rating attribute 430.

In the example shown in FIG. 4, a DSL usage event occurring during a 'Peak' daily time band, a 'Peak' weekly time band, and a Non-holiday yearly time band results in an identified time band rating attribute 438 of 'Peak-Week Day'. Similarly, a DSL usage event occurring during an 'Off-Peak' daily time band, an 'Off-Peak' weekly time band, and a Non-holiday yearly time band results in an identified time band rating attribute of 'Off-Peak-Week Day'. Another example is shown in FIG. 4: a DSL usage event occurring during a 'Peak' daily time band, a 'Peak' weekly time band, and a Holiday yearly time band results in an identified time band rating attribute of 'Peak-Holiday'.

In addition to the time at which the telecommunication usage event occurs, the charge amount for the usage event may also depend on other factors. As one example, a charge amount may depend on where the usage event originates, where the usage event connects to, or other factors. Accordingly, as shown in FIG. 5, the rating database 206 defines an origin cost code rating table 502, a destination cost code rating table 504, and an identified cost band rating table 506. In other implementations, a single cost code rating table, indexed by a usage identifier (e.g., the A number or B number), may provide both the origin cost code rating attribute and the destination cost code rating attribute. In such implementations, the master index table 258 may include one table name for a cost code rating table, rather than table names for both an origin cost code table and a destination cost code table.

The origin cost code rating table 502 may be indexed by the origin identifier 220 (e.g., an 'A Number' in a CDR). Similarly, the destination cost code rating table 504 may be indexed by the destination identifier 222 (e.g., the 'B Number' in a CDR). In the example shown in FIG. 5, an origin or destination number beginning with '001' is associated with an origin cost code rating attribute 508 or destination cost code rating attribute 510 of 'United States'. Similarly, an origin or destination number beginning with '0039' is associated with an origin cost code rating attribute 508 or destination cost code rating attribute 510 of 'Italy'. An origin or destination number beginning with '0061' is associated with an origin cost code rating attribute 508 or destination cost code rating attribute 510 of 'Australia'.

Given the rating attributes for the origin cost code and the destination cost code, the rating program 246 searches the identified cost band rating table 506 for the matching identified cost band rating attribute 512. Thus, for example, a phone call between endpoints within the United States results in an identified cost band rating attribute 512 of 'National'. Phone calls between different countries, as shown in FIG. 5, are associated with identified cost band rating attributes 512 of 'International'.

The data record parameters 218, the rating attributes, and the derived parameters (e.g., parameters derived or determined from a data record parameter or rating attribute) are parameters which influence how much the telecommunication service provider should charge for the usage event. Once the rating program 246 has searched for and obtained any rating attributes which the service provider determines is applicable to rating the usage event, the rating program 246 then obtains a unit price for the usage event.

More specifically, the rating program 246 may index any desired combination of data record parameters 218 and rating attributes into the usage charge rating table 602 shown in FIG. 6. The rating program 246 thereby determines the unit price and optionally a unit scale, billing information, or any other information associated with the usage event.

In the example shown in FIG. 6, the usage charge rating table 602 is indexed by the following data record parameters: event type and event subtype; by the following derived parameters: product name and price list; and by the following rating attributes: identified time band and identified cost band. The following rating attributes are obtained: unit price, unit scale, and billing information. The billing information may provide additional descriptive information which the billing system may add to an invoice (e.g., a description of the usage event, special rates, special charges, or any other information associated with the usage event or how the usage event was charged).

As shown in FIG. 6, for the example of a DSL usage event occurring Nationally during a Peak-Weekday time band, the unit price is $0.50/MB of data transferred. The unit scale is 1024 (the event magnitude is expected to be defined in terms of KB of data transferred). Assuming an event magnitude of 512 KB, the rating program 246 determines the charge amount 248 as:

$$\text{Charge Amount}=(0.50*512)/1024=\$0.25.$$

FIG. 7 and the discussion below provides an explanation of the processing acts accomplished by the rating program 246 and the rating system 110 to determine charge amounts for telecommunication usage events. The configurable rating system 110 receives data record parameters which may be included in CDRs, IPDRs, or other received data (Act 702). The rating program 246 may then determine a product identifier 240 based on the data record parameters (Act 704).

In addition, the rating program 246 determines a rating table set applicable for the usage event. To that end, the rating program 246 may index the product identifier and one or more of the data record parameters into the master index table 258 (Act 706). The master index table 258 associates master input parameters with the rating table set to be used for rating the usage event.

In the example given above, the rating table set includes tables for determining an identified time band rating attribute which influences the charge amount for the usage event. Thus, the rating program 246 obtains an event time for the usage event (Act 708). The event time may be obtained from the data record parameters 218 directly, or derived from data provided by the data record parameters 218. For example, the event time may be derived from a timestamp giving the number of seconds since Jan. 1, 1970. The rating program 246 searches the daily time band rating table 402 for the matching daily time band rating attribute 414 (Act 710).

The rating program 246 also obtains the day of week (Act 712). The rating program 246 searches the weekly time band rating table 404 for the matching weekly time band rating attribute 426 (Act 714). To determine whether holiday rates or other special rates are applicable, the rating program 246 obtains the day of the year (Act 716). The rating program 246 then searches the yearly time band rating table 406 for the matching yearly time band rating attribute 430 (Act 718).

Given the weekly rating attribute 426, the daily rating attribute 414, and the yearly rating attribute 430, the rating program 246 searches the identified time band rating table 408 (Act 720). The rating program 426 thereby determines an identified time band rating attribute (e.g., 'Peak-Week Day') applicable for rating the usage event.

The origin and destination of the usage event may also be relevant in determining the charge amount for the usage event. Thus, the rating program 246 obtains the origin identifier 220 (Act 722) and searches the origin cost code rating table 502 for the applicable origin cost code rating attribute 508 (Act 724). The rating program 246 also obtains the destination identifier 222 (Act 726) and searches the destination cost code rating table 504 for the matching destination cost code rating attribute 510 (Act 728).

The origin rating attribute 508 and the destination rating attribute 510 index the identified cost band rating table 506. In other words, the rating program 246 searches the identified cost band rating table 506 using the origin rating attribute 508 and the destination rating attribute 510. The rating program 246 thereby determines the applicable identified cost band rating attribute 510 (Act 730).

Knowing the cost band and the time band appropriate for rating the usage event, the rating program 246 determines the unit price and unit scale for rating the usage event. To do so, the rating program 246 searches the usage charge rating table 602 using the cost band, time band, and other relevant parameters such as the product name, event type, and event subtype. The usage charge rating table 602 returns the matching unit price and unit scale used to determine the charge amount. Once the rating program 246 has determined the unit price and unit scale, the rating program 246 determines the charge amount 248 (Act 734).

The configurable rating system 110 may then communicate the charge amount to external systems, such as the billing system 112. Alternatively, the configurable rating system 110 may communicate the charge amount to other programs running in the rating system 110. For example, a single processing system may execute rating, billing, customer management, and any other telecommunications support programs. Thus, the rating system may deliver charge amounts locally to other programs.

Table 4, below, shows an example implementation of the rating program 246 written in the Singl.eView EPM programming language. In the context of an implementation leveraging Singl.eView™ software solutions from Intec Telecom Systems PLC of Surrey, UK, the rating program 246 may be assigned to any number of telecommunication products or services. In other words, one rating program 246 may take the place of a multitude of previously established custom rating functions defined individually for each telecommunication product or service. The service provider may then modify the master index table 258, or any of the rating tables to customize the rating of every telecommunication product or service which has been assigned the rating function 246.

TABLE 4

Rating Program

```
fACS_RatingFramework_V2.0#(const ProductName$) = {
    # results
    var I_Results?0;              # Result from DA Table
    var I_TimeBandDay_Code$;
    var I_TimeBandWeek_Code$;
    var I_TimeBandYear_Code$;
    var I_TimeBand_Code$;
    var I_CostCode_Code_A$;
    var I_CostCode_Code_B$;
    var I_CostCodeMapping_Code$;
    var I_UsageCharge_Code#;
    var I_UsageUnit_Scale#;
    var I_UsageInfo_Code$;
    var I_Charge#;
    # index for DA Table
    var I_Index_M?0;              # master
    var I_Index_D?0;              # Day
    var I_Index_C?0;              # Cost
    var ErrMsgParams$0;
    # all table used
    const I_RF_Master_DA$:= 'dACS_RF_Master';
    var I_TimeBandDay_DA$;
    var I_TimeBandWeek_DA$;
    var I_TimeBand_DA$;
    var I_TimeBandYear_DA$;
    var I_CostCode_DA$;
    var I_CostCodeMapping_DA$;
    var I_ChargeAmount_DA$;
    #######################################
```

TABLE 4-continued

Rating Program

```
# Ensure a SERVICE status is ACTIVE
if (ServiceStatus& != 3)
then
{
    abort(92021,ErrMsgParams$[]);
}
#######################################
# Get DA table names for the product
# Define index for lookup
I_Index_M$[0] := ProductName$;
I_Index_M$[1] := to_string(EventTypeCode&);
I_Index_M$[2] := to_string(EventSubTypeCode&);
I_Index_M$[3] := ServiceGeneral5$;
if DerivedTableLookupByDatex&(I_RF_Master_DA$,
                ChargeStartDate~,
                I_Index_M$[],
                I_Results?[])
then
{
        I_TimeBandDay_DA$       := I_Results$[0];
            I_TimeBandWeek_DA$      := I_Results$[1];
        I_TimeBandYear_DA$      := I_Results$[2];
            I_TimeBand_DA$          := I_Results$[3];
        I_CostCode_DA$          := I_Results$[4];
            I_CostCodeMapping_DA$ := I_Results$[5];
    I_ChargeAmount_DA$          := I_Results$[6];
}
#######################################
# Get Time Band Day Code
# Define index for lookup
I_Index_D$[0] := '00' +
            to_string(hourofday(ChargeStartDate~),'00') +
            to_string(minutes(ChargeStartDate~),'00') +
            to_string(seconds(ChargeStartDate~),'00');
if DerivedTableLookupByDatex&(I_TimeBandDay_DA$,
                ChargeStartDate~,
                I_Index_D$[],
                I_Results?[])
then
{
        I_TimeBandDay_Code$     := to_string(I_Results&[0]);
}
#######################################
# Get Time Band Week Code
# Define index for lookup
I_Index_M$[0] := ProductName$;
I_Index_M$[1] := to_string(EventTypeCode&);
I_Index_M$[2] := to_string(EventSubTypeCode&);
I_Index_M$[3] := ServiceGeneral5$;
I_Index_M$[4] := to_string(dayofweek(ChargeStartDate~),'0');
if DerivedTableLookupByDatex&(I_TimeBandWeek_DA$,
                ChargeStartDate~,
                I_Index_M$[],
                I_Results?[])
then
{
        I_TimeBandWeek_Code$        := to_string(I_Results&[0]);
}
#######################################
# Get Time Band Code
# Define index for lookup
I_Index_M$[0] := ProductName$;
I_Index_M$[1] := to_string(EventTypeCode&);
I_Index_M$[2] := to_string(EventSubTypeCode&);
I_Index_M$[3] := ServiceGeneral5$;
I_Index_M$[4] := I_TimeBandDay_Code$;
I_Index_M$[5] := I_TimeBandWeek_Code$;
if DerivedTableLookupByDatex&(I_TimeBand_DA$,
                ChargeStartDate~,
                I_Index_M$[],
                I_Results?[])
then
{
        I_TimeBand_Code$        := to_string(I_Results&[0]);
}
#######################################
```

TABLE 4-continued

| Rating Program |
|---|

```
# Get Time Band Year Code (override TimeBand)
# Define index for lookup
I_Index_D$[0] := ProductName$;
I_Index_D$[1] := to_string(EventTypeCode&);
I_Index_D$[2] := to_string(EventSubTypeCode&);
I_Index_D$[3] := ServiceGeneral5$;
I_Index_D$[4] := to_string((monthofyear(ChargeStartDate~)+1),'00') +
            to_string(dayofmonth(ChargeStartDate~),'00');
if DerivedTableLookupByDatex&(I_TimeBandYear_DA$,
                ChargeStartDate~,
                I_Index_D$ẞ,
                I_Results?ẞ)
then
{
        I_TimeBand_Code$    := to_string(I_Results&[0]); #override TimeBand if it's holiday
}
######################################
# Get Cost Code for AParty (prefix)
# Define index for lookup
I_Index_C$[0] := APartyId$;
if DerivedTableLookupByDatex&(I_CostCode_DA$,
                ChargeStartDate~,
                I_Index_C$ẞ,
                I_Results?ẞ)
then
{
        I_CostCode_Code_A$   := to_string(I_Results&[0]);
}
######################################
# Get Cost Code for BParty (prefix)
# Define index for lookup
I_Index_C$[0] := BPartyId$;
if DerivedTableLookupByDatex&(I_CostCode_DA$,
                ChargeStartDate~,
                I_Index_C$ẞ,
                I_Results?ẞ)
then
{
        I_CostCode_Code_B$   :=to_string(I_Results&[0]);
}
######################################
# Get Network Scenario Code
# Define index for lookup
I_Index_M$[0] := ProductName$;
I_Index_M$[1] := to_string(EventTypeCode&);
I_Index_M$[2] := to_string(EventSubTypeCode&);
I_Index_M$[3] := ServiceGeneral5$;
I_Index_M$[4] := I_CostCode_Code_A$;
I_Index_M$[5] := I_CostCode_Code_B$;
if DerivedTableLookupByDatex&(I_CostCodeMapping_DA$,
                ChargeStartDate~,
                I_Index_M$ẞ,
                I_Results?ẞ)
then
{
        I_CostCodeMapping_Code$ := to_string(I_Results&[0]);
}
else
{
        I_Index_M$[5] := I_CostCode_Code_A$;
        I_Index_M$[4] := I_CostCode_Code_B$;
        if DerivedTableLookupByDatex&(I_CostCodeMapping_DA$,
                    ChargeStartDate~,
                    I_Index_M$ẞ,
                    I_Results?ẞ)
            then
            {
             I_CostCodeMapping_Code$ := to_string(I_Results&[0]);
            }
}
######################################
# Get Charge Amount
# Define index for lookup
I_Index_M$[0] := ProductName$;
I_Index_M$[1] := to_string(EventTypeCode&);
I_Index_M$[2] := to_string(EventSubTypeCode&);
I_Index_M$[3] := ServiceGeneral5$;
```

TABLE 4-continued

Rating Program

```
    I_Index_M$[4] := I_TimeBand_Code$;
    I_Index_M$[5] := I_CostCodeMapping_Code$;
    if DerivedTableLookupByDatex&(I_ChargeAmount_DA$,
                    ChargeStartDate~,
                    I_Index_M$[],
                    I_Results?[])
    then
    {
            I_UsageCharge_Code# := I_Results#[0];
            I_UsageUnit_Scale#  := I_Results#[1];
            I_UsageInfo_Code$   := I_Results$[2];
    }
    #######################################
    I_Charge# := I_UsageCharge_Code# * (Duration# / I_UsageUnit_Scale#); #Duration converted
basing on unit scale
    #######################################
    #assign return values to DA vairbales
    dACS_ChgFramework_General1$ := ProductName$;
    dACS_ChgFramework_General2$ := to_string(EventTypeCode&)+' -
'+to_string(EventSubTypeCode&);
    dACS_ChgFramework_General3$ := to_string(ServiceGeneral5$);
    dACS_ChgFramework_General4$ := to_string(ChargeStartDate~)+ ' - '+to_string(APartyId$)+' -
'+to_string(BPartyId$);
    dACS_ChgFramework_General5$ := to_string(I_UsageCharge_Code#);
    dACS_ChgFramework_General6$ := to_string(Duration#);
    dACS_ChgFramework_General7$ := to_string(I_Charge#);
    return I_Charge#;
```

The data record parameters 218, master index table 214, rating tables, and rating attributes are not limited to the examples given above. Instead, a telecommunications service provider may define any rating attributes and rating tables, indexed according to any desired parameters, which the telecommunications service provider will use to determine the charge amount for a usage event. For example, a service provider may not make a cost distinction based on the origin or destination of the usage event, and may eliminate the origin cost code or destination cost code rating tables. As another example, a service provider may determine that the additional call data record parameters should be used to determine the origin cost code rating attribute 508 or destination rating attribute 510. Accordingly, the service provider may expand the origin and destination cost code tables 502 and 504 to include additional index fields.

Figure 8:
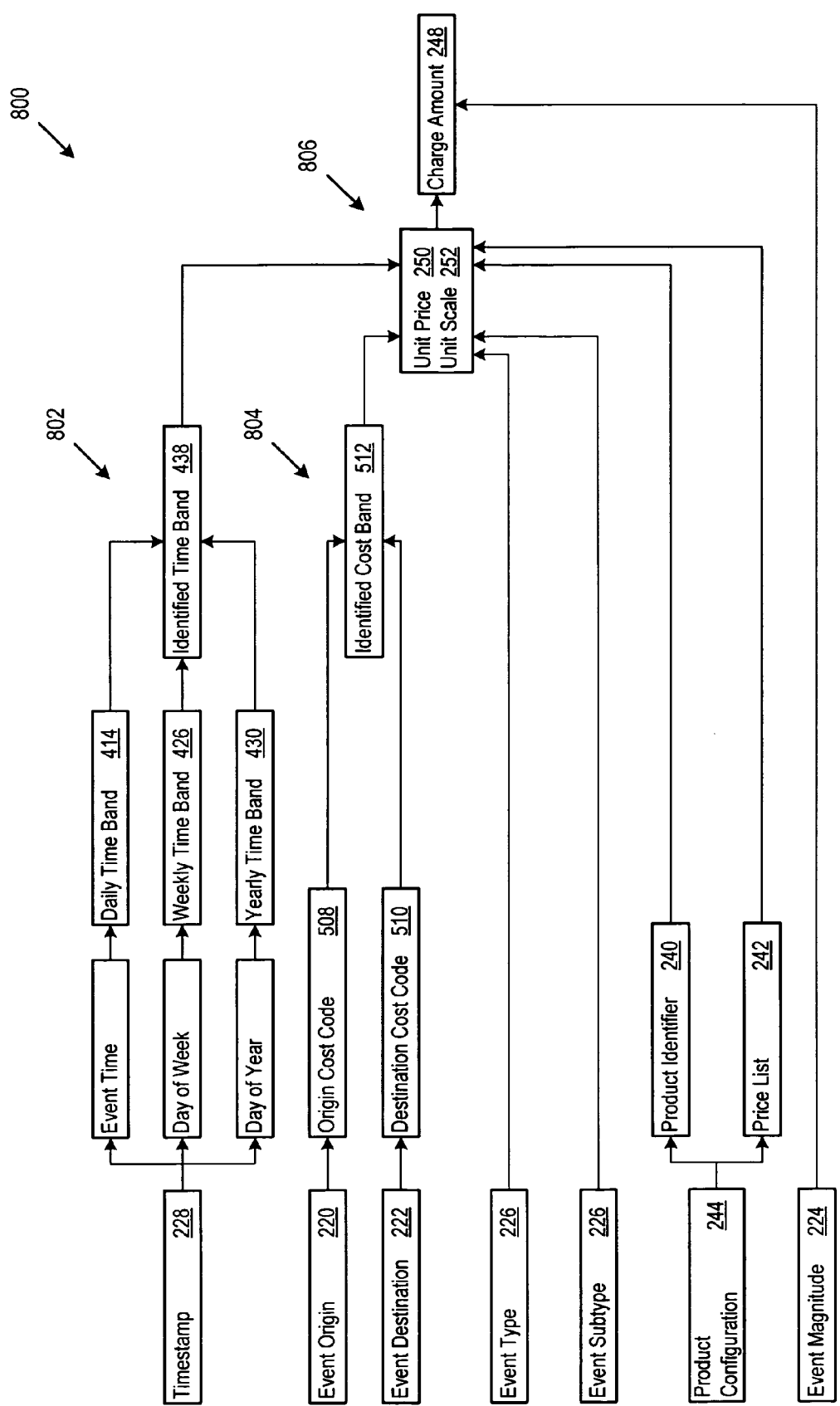
FIG. 8 shows the tree relationship established by the rating tables to determine a unit price for a usage event.

FIG. 8 shows a timing hierarchy 802 based on event timing. The timing hierarchy 802 is established in the identified time band rating table 408. In particular, the identified time band rating table 408 is indexed by the daily time band, weekly time band, and yearly time band rating attributes 414, 426, and 430 to determine the identified time band rating attribute 438. Thus, the final identification of an appropriate time band for rating the usage event depends on previously determined parameters.

FIG. 8 also shows a location hierarchy 804 based on event location. The location hierarchy 804 is established in the identified cost band rating table 506. In particular, the identified cost band rating table 506 is indexed by the origin cost code and destination cost code rating attributes 508 and 510 to determine the identified cost band rating attribute 510. Thus, the final identification of an appropriate cost band for rating the usage event with respect to the location over which it occurs depends on previously determined location parameters.

A charging hierarchy 806 is a third hierarchy which the rating database 206 establishes. Specifically, the charging hierarchy 806 provides enormous flexibility in determining the unit price 250 and unit scale 252 for the usage event. To that end, the charging hierarchy 806 establishes that the unit price 250 and unit scale 252 depend upon two previously rating attribute parameters: the identified time band 438 and the identified cost band 512.

In the discussion below, the rating tables and rating parameters are referred to as derived attribute tables and derived parameters with regard to an implementation of the rating system 110 in the Singl.eView™ environment. FIG. 9 shows an implementation of an identified time band derived attribute table 900, a cost code derived attribute table 904, and a daily time band derived attribute table 910. The identified time band derived attribute table 900 and cost code derived attribute table 904 may be used in an implementation of the configurable rating system 110 in the Singl.eView™ billing environment, for example. Compared with the description of the processing given above, the implementation of the identified time band derived attribute table 900 omits the yearly time band index field 436 described above in the identified time band table 408 shown in FIG. 4. In the implementation, the rating program 246 determines the identified time band derived attribute 902 based on the product name field, event type field, event sub-type field, price list field, daily time band field, and the weekly time band field. In this implementation, the rating program 246 may override the identified time band derived attribute 902 based on whether the date on which the usage event occurs is a Holiday.

Furthermore, in this implementation, the cost code derived attribute table 904 is indexed by a call prefix field 906. The call prefix field matches to a cost code provided in the cost code field 908. For example, the '001' call prefix results in a cost code derived attribute of 'United States'. The cost code table 904 may provide cost code derived attributes for both the origin call prefix and the destination call prefix. In addition, the implementation may use the daily time band derived attribute table 910. The daily time band derived attribute table 910 is indexed by the start time field 912 and provides a matching daily time band derived attribute for that stat time from the daily time band field 914.

Based on the implementation of the identified time band derived attribute table 900, FIG. 10 shows the acts that the configurable rating system 110 may take to rate a telecommunication usage event. The rating system 110 indexes the product name, event type, event subtype, and price list into the master index table 258 to determine a derived attribute table set for rating a usage event (Act 1002). The rating system 110 also obtains an event start time (Act 1004) and searches the daily time band table 910 to determine the applicable daily time band derived attribute from the daily time band field 914 (Act 1006). Similarly, the rating system 110 obtains the event day (Act 1008) and searches the weekly time band table 404 to determine the applicable weekly time band derived attribute 426 (Act 1010).

Next, the rating system 110 searches the identified time band table 900 to determine an identified time band derived attribute 902 (Act 1012). In particular, the rating program 246 indexes into the identified time band table 900 using the product name field, event type field, event sub-type field, price list field, daily time band field, and the weekly time band field. The matching identified time band 902 is obtained.

The rating program 246 also determines whether the usage event occurred on a Holiday (or any other special day when special rates may be applicable). To do so, the rating program 246 obtains the day of year (Act 1014). The rating program 246 then searches the yearly time band derived attribute table 406 to determine whether the yearly time band derived attribute 430 indicates a holiday (Act 1016).

The rating program 246 searches the yearly time band derived attribute table 406 based on the product name, event type, event subtype, price list, and date. If the yearly time band derived attribute 430 indicates a Holiday, the rating program 246 overrides the previously identified time band derived attribute (Act 1018). Thus, the rating program 246 changes the identified time band derived attribute to indicate whether or not the usage event occurred on a Holiday.

The rating program 246 may then obtain a call prefix from an origin identifier 220 (Act 1020) and search the cost code derived attribute table 904 (e.g., by best match) to determine the origin cost code derived attribute from the cost code field 908 (Act 1022). Similarly, the rating program obtains the call prefix from the destination identifier 222 (Act 1024) and searches the cost code derived attribute table 904 (e.g., by best match) to determine a destination cost code derived attribute from the cost code field 908 (Act 1026). The rating program 246 indexes the origin and destination cost code derived attributes, the product name, the event type, event subtype, and price list into the identified cost band table 506 to determine the identified cost band derived attribute 512 applicable for rating the usage event (Act 1028).

Next, the rating program 246 determines the unit price and unit scale. In particular, the rating program 246 indexes the product name, event type, event subtype, price list, identified time band, and identified cost band into the usage charge table 602. The matching unit price and unit scale are obtained from the unit price field 604 and unit scale field 606 (Act 1030). The rating program 246 may also obtain additional billing information (e.g., a description to be printed on a bill) from the billing formation field 608. Given the unit price, unit scale, and event magnitude, the rating program 246 may determine the charge amount according to:

$$charge\_amount = unit\ price * event\ magnitude / unit\ scale$$
(Act 1032).

The configurable rating system 110 employs several technical solutions to the technical problems of efficiently, flexibly, and quickly configuring extensive rating functionality for an enormous array of telecommunications products and services. As a result, a service provider is not limited by the time consuming complexities typically associated with defining custom rating functions for each telecommunication product or service.

One technical solution is the use of a master index table to provide a first level of parameter indirection. The indirection allows the configurable rating system 110 to establish any number of rating table sets which a service provider may employ to rate a telecommunication usage events for any number of different telecommunication products or services. Multiple rating table sets are not necessary, however, because the configurable rating system 110 may use any given rating table set to rate usage events for multiple telecommunication products or services. Thus, even a single rating table set may support rating functions for a wide variety of telecommunications products or services, including services relating to voice traffic, data traffic, or any other type of service. The first level of parameter indirection provides the flexibility for the service provider to define as many or as few sets of rating attribute tables as desired for rating usage events for any number of telecommunication products or services. In other words, the first level of parameter indirection ensures that the service provider is not limited to a single set of rating tables which must be used in every instance to rate a usage event.

Another technical solution lies in assigning (e.g., in a Singl.eView™ processing engine) a single rating program to rate multiple telecommunication usage events. In the past a service provider defined, coded, debugged, and maintained a multitude of different rating functions and individually assigned the rating functions to different telecommunication usage events. As a more efficient alternative, the service provider may now design, debug, and assign a single rating function which employs the table-driven charge determination approach explained above. The table driven approach makes available extraordinary flexibility in establishing and employing the parameters which are useful to rate a telecommunication usage event. At the same time, the telecommunication service provider may use as much or as little of the flexibility as desired.

Another technical solution is provided in ultimately determining a unit price for the usage event. In particular, the rating tables establish attribute hierarchies of derived parameters as shown in FIG. 8. The hierarchies permit rating attributes to depend upon other earlier derived attributes for additional flexibility in determining the unit price for the usage event. The rating tables establish the hierarchies using table fields indexed by rating attributes obtained from other tables.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A configurable rating system for a telecommunications service provider, the configurable rating system comprising:
    a rating database comprising:
        a master index table comprising a first mapping record which establishes a first rating table set applicable for a first master input parameter set;
        multiple rating tables establishing the first rating table set;

memory comprising:
  data record parameters which report a usage event, including an event magnitude and an origin identifier; and
  a rating determination program operable to determine a charge amount for the usage event, the rating determination program comprising instructions which:
    determine a product identifier using at least one of the data record parameters;
    index at least the product identifier into the master index table to identify the first rating table set;
    execute a sequence of searches through the first rating table set using at least some of the data record parameters and rating attributes obtained from the rating tables, to obtain a unit price for the usage event; and
    determine the charge amount based on the unit price and the event magnitude; and
  a processor coupled to the memory and the rating database which executes the rating determination program.

2. The configurable rating system of claim 1, where the first rating table set is applicable to multiple different telecommunications products or services.

3. The configurable rating system of claim 1, where:
the rating attributes comprise an origin cost code rating attribute; the first rating attribute table set comprises an origin cost code rating table; and
the instructions which execute the sequence of searches comprise instructions which index the origin identifier into the origin cost code rating table to obtain the origin cost code rating attribute.

4. The configurable rating system of claim 3, where:
the rating attributes further comprise a destination cost code rating attribute;
the data record parameters further comprise a destination identifier;
the first rating table set further comprises a destination cost code rating table; and
the instructions which execute the sequence of searches comprise instructions which index the destination identifier into the destination cost code rating table to obtain the destination cost code rating attribute.

5. The configurable rating system of claim 4, where:
the rating attributes further comprise a cost band rating attribute;
the first rating table set further comprises a cost band rating table; and
the instructions which execute the sequence of searches comprise instructions which index the origin cost code rating attribute and the destination cost code rating attribute into the cost band rating table to obtain the cost band rating attribute.

6. The configurable rating system of claim 1:
where the rating attributes comprise a time band rating attribute and a cost band rating attribute;
the first rating table set comprises a usage charge rating table; and
the instructions which execute the sequence of searches comprise instructions which index the time band rating attribute and the cost band rating attribute into the usage charge rating table to obtain the unit price.

7. The configurable rating system of claim 1, where:
the rating attributes comprise a daily time band rating attribute;
the data record parameters further comprise an event start time and an event end time;
the first rating table set comprises a daily time band rating table; and
the instructions which execute the sequence of searches comprise instructions which index the event start time and the event end time into the daily time band rating table to obtain the daily time band rating attribute.

8. The configurable rating system of claim 7, where:
the rating attributes comprise a weekly time band rating attribute;
the data record parameters further comprise an event day;
the first rating table set further comprises a weekly time band rating table; and
the instructions which execute the sequence of searches comprise instructions which index the event day into the weekly time band rating table to obtain the weekly time band rating attribute.

9. The configurable rating system of claim 8, where:
the rating attributes comprise a yearly time band rating attribute;
the data record parameters further comprise an event date;
the first rating table set comprises a yearly time band rating table; and
the instructions which execute the sequence of searches comprise instructions which index the event date into the yearly time band rating table to obtain the yearly time band rating attribute.

10. The configurable rating system of claim 9, where:
the rating attributes comprise an identified time band rating attribute;
the first rating table set comprises an identified time band rating table; and
the instructions which execute the sequence of searches comprise instructions which index the daily time band rating attribute and the weekly time band rating attribute into the identified time band rating table to obtain the identified time band rating attribute.

11. The configurable rating system of claim 10, where the rating determination program further comprises instructions which:
override the identified time band rating attribute when the yearly time band rating attribute indicates a 'Holiday'.

12. The configurable rating system of claim 1, where:
the rating attributes comprise a time band rating attribute and a cost band rating attribute;
the data record parameters further comprise an event type;
the first rating table set comprises a usage charge rating table; and
the instructions which execute the sequence of searches comprise instructions which index the time band rating attribute, the cost band rating attribute, the event type, and the product identifier into the usage charge rating table to obtain the unit price.

13. The configurable rating system of claim 1, where:
the rating attributes comprise a time band rating attribute and a cost band rating attribute;
the data record parameters further comprise an event type and an event sub-type;
the first rating table set comprises a usage charge rating table;
the instructions which execute the sequence of searches comprise instructions which index the time band rating attribute, the cost band rating attribute, the event type, the event sub-type, and the product identifier into the usage charge rating table to obtain the unit price and a unit scale; and the instructions which determine the charge amount comprise instructions which determine the charge amount according to:

Charge Amount=(Unit Price*Event Magnitude)/(Unit Scale).

14. A method for rating a telecommunications usage event, the method comprising:
  establishing a master index table comprising a first mapping record which
  establishes a first rating table set applicable for a first master input parameter set;
  establishing rating tables included in the first rating table set;
  storing in a memory data record parameters which report a usage event, including an event magnitude and an origin identifier;
  determining a product identifier using at least one of the data record parameters;
  indexing at least the product identifier into the master index table to identify the first rating table set;
  executing a sequence of searches through the first rating table set using at least some of the data record parameters and rating attributes obtained from the rating tables, to obtain a unit price for the usage event; and
  determining the charge amount based on the unit price and the event magnitude.

15. The method of claim 14, where:
  the rating attributes comprise an origin cost code rating attribute;
  the first rating table set comprises an origin cost code rating table; and
  executing a sequence of searches includes indexing the origin identifier into the origin cost code rating table to obtain the origin cost code rating attribute.

16. The method of claim 15, where:
  the rating attributes further comprise a destination cost code rating attribute;
  the data record parameters further comprise a destination identifier;
  the first rating table set further comprises a destination cost code rating table; and
  executing a sequence of searches includes indexing the destination identifier into the destination cost code rating table to obtain the destination cost code rating attribute.

17. The method of claim 16, where:
  the rating attributes further comprise a cost band rating attribute;
  the first rating table set further comprises a cost band rating table; and
  executing a sequence of searches includes indexing the origin cost code rating attribute and the destination cost code rating attribute into the cost band rating table to obtain the cost band rating attribute.

18. The method of claim 14:
  where the rating attributes comprise a time band rating attribute and a cost band rating attribute;
  the first rating table set comprises a usage charge rating table; and
  executing a sequence of searches includes indexing the time band rating attribute and the cost band rating attribute into the usage charge rating able to obtain the unit price.

19. The method of claim 14, where:
  the rating attributes comprise a daily time band rating attribute;
  the data record parameters further comprise an event start time and an event end time;
  the first rating table set comprises a daily time band rating table; and
  executing a sequence of searches includes indexing the event start time and the event end time into the daily time band rating table to obtain the daily time band rating attribute.

20. The method of claim 19, where:
  the rating attributes comprise a weekly time band rating attribute;
  the data record parameters further comprise an event day;
  the first rating table set further comprises a weekly time band rating table; and
  executing a sequence of searches includes indexing the event day into the weekly time band rating table to obtain the weekly time band rating attribute.

21. The method of claim 20, where:
  the rating attributes comprise a yearly time band rating attribute;
  the data record parameters further comprise an event date;
  the first rating table set comprises a yearly time band rating table; and
  executing a sequence of searches includes indexing the event date into the yearly time band rating table to obtain the yearly time band rating attribute.

22. The method of claim 21, where:
  the rating attributes comprise an identified time band rating attribute;
  the first rating table set comprises an identified time band rating table; and
  executing a sequence of searches includes indexing the daily time band rating attribute and the weekly time band rating attribute into the identified time band rating table to obtain the identified time band rating attribute.

23. The method of claim 22, further comprising:
  overriding the identified time band rating attribute when the yearly time band rating attribute indicates a 'Holiday'.

24. The method of claim 14, where:
  the rating attributes comprise a time band rating attribute and a cost band rating attribute;
  the data record parameters further comprise an event type;
  the first rating table set comprises a usage charge rating table; and
  executing a sequence of searches includes indexing the time band rating attribute, the cost band rating attribute, the event type, and the product identifier into the usage charge rating table to obtain the unit price.

25. The method of claim 14, where:
  the rating attributes comprise a time band rating attribute and a cost band rating attribute;
  the data record parameters further comprise an event type and an event sub-type;
  the first rating table set comprises a usage charge rating table;
  executing a sequence of searches includes indexing the time band rating attribute, the cost band rating attribute, the event type, the event sub-type, and the product identifier into the usage charge rating table to obtain the unit price and a unit scale; and further comprising:
  determining the charge amount according to:

Charge Amount=(Unit Price*Unit Scale)/(Event Magnitude).

* * * * *